United States Patent
Otanez et al.

(10) Patent No.: US 9,482,339 B2
(45) Date of Patent: Nov. 1, 2016

(54) CVT RATIO CHANGE CONTROL DURING A SUDDEN VEHICLE STOP

(71) Applicant: GM GLOBAL TECHNOLOGY OPERATIONS LLC, Detroit, MI (US)

(72) Inventors: Paul G. Otanez, Troy, MI (US); Zhen J. Zhang, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/640,744

(22) Filed: Mar. 6, 2015

(65) Prior Publication Data

US 2016/0258532 A1 Sep. 8, 2016

(51) Int. Cl.
*F16H 61/662* (2006.01)
*F16H 9/16* (2006.01)

(52) U.S. Cl.
CPC .......... *F16H 61/66231* (2013.01); *F16H 9/16* (2013.01)

(58) Field of Classification Search
CPC ............ F16H 59/70; F16H 2059/704; F16H 61/66231; F16H 2312/16; B60W 10/107
See application file for complete search history.

(56) References Cited

U.S. PATENT DOCUMENTS

| 5,113,718 | A  | * | 5/1992  | Sato ................. | F16H 61/66259 180/197 |
| 5,310,384 | A  | * | 5/1994  | Siemon ............... | F16H 59/38 474/101 |
| 2007/0270280 | A1 | * | 11/2007 | Takamatsu ............ | F16H 61/24 477/125 |
| 2011/0313719 | A1 | * | 12/2011 | Yamaguchi ............ | F16H 9/18 702/150 |
| 2012/0059559 | A1 | * | 3/2012  | Tanaka ............... | F16H 61/66259 701/52 |

* cited by examiner

*Primary Examiner* — Huan Le
(74) *Attorney, Agent, or Firm* — Quinn Law Group, PLLC

(57) ABSTRACT

A continuously variable transmission (CVT) includes input and output members, a primary variator pulley, and a secondary variator pulley. The respective variator pulleys are responsive to primary and secondary pressures. Speed sensors measure a respective rotational speed of each variator pulley. A controller executes a method by receiving the measured rotational speeds, calculating a current speed ratio of the CVT above a threshold CVT speed ratio using the rotational speeds, comparing the calculated current speed ratio to calibrated threshold ratios during a sudden stop event of the vehicle, and selectively executing a CVT control action after the calculated current speed ratio drops below the threshold CVT speed ratio during the sudden stop event. The control action depends on which of the threshold ratios is exceeded by the calculated current speed ratio after the calculated current speed ratio drops below the threshold CVT speed ratio, and on the measured rotational speeds.

18 Claims, 3 Drawing Sheets

CVT RATIO CHANGE CONTROL DURING A SUDDEN VEHICLE STOP

TECHNICAL FIELD

The present disclosure relates to ratio change control of a continuously variable transmission during a sudden vehicle stop.

BACKGROUND

A continuously variable transmission (CVT) is a type of power transmission that is capable of achieving infinite variability between a highest and a lowest possible speed ratio. Unlike conventionally-geared transmissions that use one or more planetary gear sets and multiple rotating and braking friction clutches to establish a discrete gear state, a CVT uses a variable-diameter pulley system known as a variator assembly to transition anywhere within a calibrated range of speed ratios.

A typical variator assembly includes two variator pulleys interconnected via an endless rotatable drive element such as a chain or a belt. The drive element rides in a variable-width gap defined by conical faces of mating halves of the pulleys. One of the pulleys is typically connected to an engine crankshaft and thus acts as a driving/primary pulley. The other pulley is connected to a CVT output shaft to act as a driven/secondary pulley. One or more gear sets could be used on the input and/or output side of the variator assembly depending on the design. In order to vary a CVT speed ratio, a shift force is applied to the primary pulley and/or the secondary pulley via one or more pulley actuators. The shift force effectively squeezes the pulley halves together to change the width of the gap between the conical pulley faces. Variation in the gap size, which is also referred to as the pitch radius, causes the drive element to ride higher or lower within the gap. This in turn changes the effective diameters of the variator pulleys and thus the speed ratio of the CVT.

SUMMARY

An example vehicle is disclosed herein that includes an internal combustion engine, a continuously variable transmission (CVT), and a controller programmed to control a speed ratio of the CVT in a particular manner during/after a sudden stop of the vehicle. The CVT includes an endless rotatable drive element and a variator assembly of the type noted above. During the sudden stop event of the vehicle, the pulley speeds will quickly reach a low threshold speed before a calibrated minimum CVT speed ratio can be attained. The controller is therefore programmed to execute steps of an associated control method and ultimately command appropriate control actions with respect to the CVT during such a sudden stop event, i.e., at any time the variator pulley speeds are sufficiently low that the variator pulley speeds cannot be accurately measured.

In an example embodiment, a CVT includes an input member, an output member, a primary variator pulley operable for receiving an input torque, a secondary variator pulley operable for transmitting an output torque, first and second speed sensors, and a controller. The primary and secondary variator pulleys are responsive to a respective primary and secondary pressure. The speed sensors are operable for measuring a respective rotational speed of the primary and secondary variator pulleys. The controller is in communication with the first and second speed sensors, and is programmed to receive the measured rotational speeds of the primary and secondary variator pulleys from the first and second speed sensors.

The programming of the controller also enables the controller to calculate a current speed ratio of the CVT above a threshold CVT speed ratio using the measured rotational speeds, and to compare the calculated current speed ratio to a plurality of calibrated threshold ratios during a sudden stop event of the vehicle. The controller selectively executes one of a plurality of CVT control actions after the calculated current speed ratio (SR) drops below the threshold CVT speed ratio during the sudden stop event, wherein the executed CVT control action depends on which of the plurality of calibrated threshold ratios is exceeded by the calculated current speed ratio (SR) after the calculated current speed ratio reaches and drops below the threshold CVT speed ratio and the measured rotational speeds.

A method of controlling a speed ratio of the CVT includes receiving, via a controller, a measured rotational speed of a primary and a secondary variator pulley of the CVT from a first and a second speed sensor, respectively. The method also includes calculating, via the controller, a current speed ratio of the CVT above a threshold CVT speed ratio using the measured rotational speeds and comparing the calculated current speed ratio to a plurality of calibrated threshold ratios during a sudden stop event of the vehicle. Additionally, the method includes selectively executing one of a plurality of CVT control actions, via the controller, after the calculated current speed ratio drops below the threshold CVT speed ratio during the sudden stop event in a manner that depends on which of the plurality of calibrated threshold ratios is exceeded by the calculated current speed ratio after the calculated current speed ratio drops below the threshold CVT speed ratio and the measured rotational speeds.

The above features and advantages and other features and advantages of the present disclosure are readily apparent from the following detailed description when taken in connection with the accompanying drawings.

DETAILED DESCRIPTION

Figure 1:
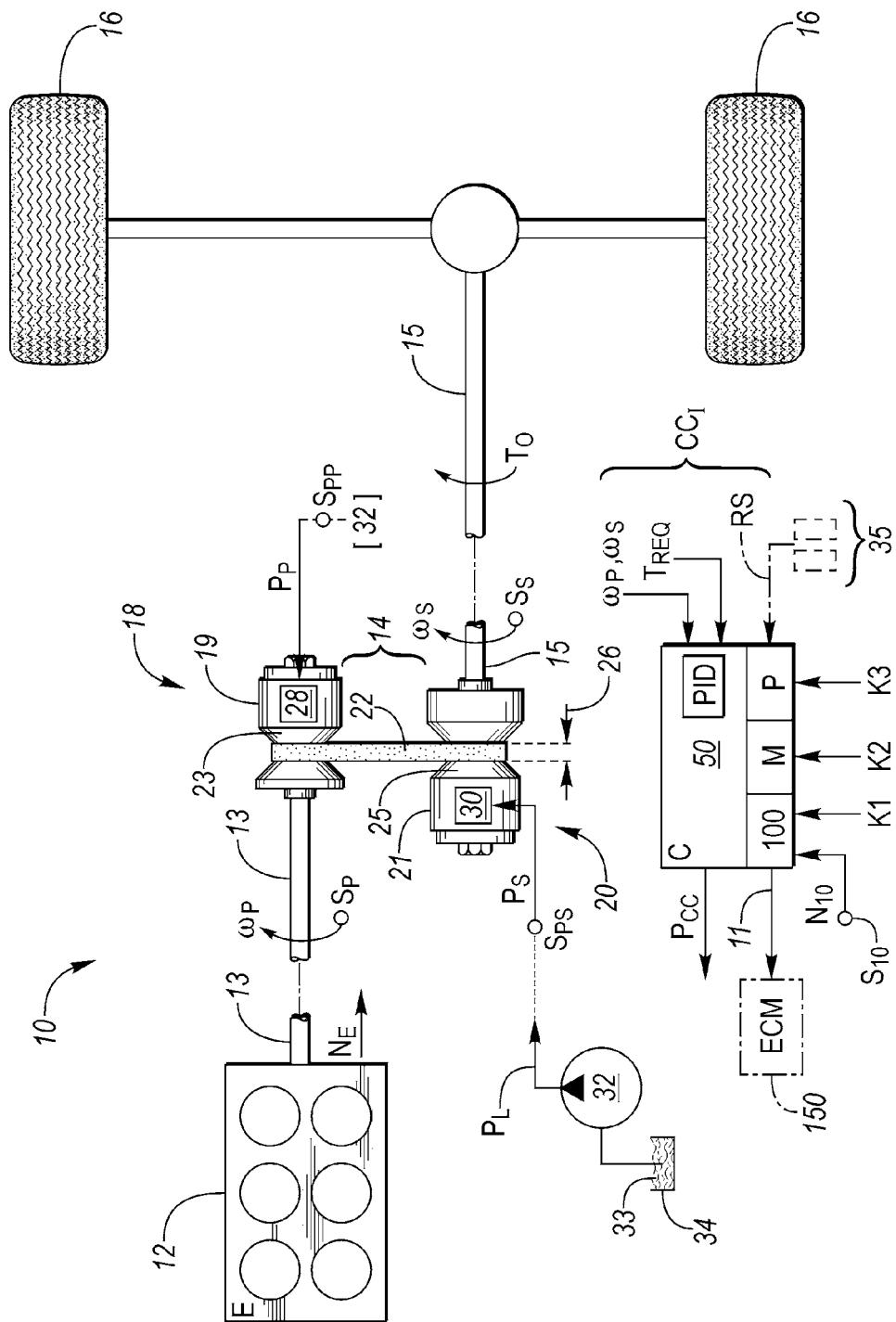
FIG. 1 is a schematic illustration of an example vehicle having a continuously variable transmission (CVT) and a controller programmed to control the CVT during a sudden stop event of the vehicle as set forth herein.

Referring to the drawings, wherein like reference numbers correspond to like or similar components throughout the several figures, a vehicle 10 is shown schematically in FIG. 1. The vehicle 10 includes a torque generating device 12, shown as an example internal combustion engine (E), but which also may be embodied as an electric machine or other suitable device operable for generating output torque. For illustrative consistency, the torque generating device 12 will be described hereinafter as an engine 12 without limiting the scope to such a design.

The vehicle 10 also includes a continuously variable transmission (CVT) 14 and a controller (C) 50. As set forth below in further detail with reference to the flow chart of FIG. 2 and with additional reference to the time plots of FIGS. 3-5, the controller 50 is programmed to calculate a current speed ratio of the CVT 14, and to perform other actions with respect to the CVT 14 during a sudden stop event of the vehicle 10, i.e., any event in which rotational speeds of a primary and secondary variator pulley 18 and 20 are too low to accurately measure.

The controller 50 is also programmed to transmit pulley pressure control signals (arrow $P_{CC}$) to the primary and secondary variator pulleys 18 and 20 during/after a sudden stop event in which a programmed/calibrated minimum CVT speed ratio optimal for launch, hereinafter a first threshold ratio (k1), is not reached, and to communicate a state of speed ratio uncertainty to another controller, e.g., an engine control module (ECM) 150, via a state signal (arrow 11) after such a sudden stop event. The controller 50 also selectively estimates the current CVT speed ratio under certain operating conditions when the primary and secondary pulley speeds $\omega_P$ and $\omega_S$ as determined via respective pulley speed sensors $S_P$ and $S_S$ are below a second threshold ratio (k2), which exceeds the first threshold ratio (k1) but at which the pulley speeds $\omega_P$ and $\omega_S$ are still below a sensor resolution or threshold for accurate measurement.

As is known in the art, accuracy or resolution of speed sensors such as the speed sensors $S_P$ and $S_S$ can be relatively low at lower rotational speeds, and therefore it may be difficult to accurately calculate the current CVT ratio during and after a sudden stop event of the vehicle 10. The controller 50 is therefore programmed with the first, second, and third threshold ratios (k1, k2, k3) via programming of memory (M) of the controller 50, e.g., in a lookup table. The controller 50 determines whether these calibrated thresholds are reached during the sudden stop event upon crossing or dropping below a calibrated speed ratio indicative of a last known valid calculated measurement. Such a value may be determined offline and stored in memory (M), and may be expected to vary based on the design of the particular sensors $S_P$, $S_S$ being used, as well as the vehicle platform, torque converter, and variator geometry. The ideal situation is that the first threshold ratio (k1) is reached before the primary and secondary pulleys 18 and 20 have stopped rotating. No additional control actions are required when this result occurs. When this result does not occur, however, the controller 50 instead executes one of a number of different possible control actions with respect to the CVT 14 depending on the calculated current speed ratio (SR), where $$SR = \frac{\omega_S}{\omega_P},$$

and the pulley speeds, or more precisely, whether or not the primary and secondary pulleys 18 and 20 have stopped rotating. A method 100 and the various conditions for the control actions are set forth below with reference to FIGS. 2-5.

With respect to the example vehicle 10 of FIG. 1, the engine 12 includes an output shaft/crankshaft 13. The crankshaft 13 is connected to the CVT 14, which in turn includes an output shaft 15. The output shaft 15 ultimately delivers output torque (arrow To) to a set of drive wheels 16. The CVT 14 includes the primary variator pulley 18, which is connected to and driven by the crankshaft 13, the secondary variator pulley 20 which is connected to the output shaft 15, and a continuous rotating drive element or CVT belt 22. The term "belt" as used herein refers to any closed/endless loop of rubber and/or metal suitable for transmitting torque from the primary variator pulley 18 to the secondary variator pulley 20, including a loop of chain or a conventional rubber and metal CVT drive belt. For simplicity, the term "belt" is used hereinafter to refer to any suitable endless rotatable element.

The primary and secondary variator pulleys 18 and 20 each have mating halves 19 and 21, respectively, with respective conical faces 23 and 25 defining a variable-width gap 26. The belt 22 is positioned within the gap 26 and rides on the conical faces 23 and 25 as the engine 12 powers the primary pulley 18 at engine speed ($N_E$), which thus acts as the input speed/primary speed ($\omega_P$) of the primary pulley 18. The secondary pulley 20 rotates at the secondary speed ($\omega_S$). As noted above, both pulley speeds ($\omega_P$, $\omega_S$) may be measured via the sensors $S_P$ and $S_S$ and reported to the controller 50, for instance as signals over a controller area network or other suitable channels.

The width of the gap 26 may be varied via movement of the mating halves 19 and/or 21 so as to change the current speed ratio of the CVT 14. Therefore, the vehicle 10 of FIG. 1 includes respective first and second variator actuators 28 and 30 each responsive to primary and secondary pressures (arrows $P_P$ and $P_S$ respectively) measurable via corresponding pulley pressure sensors ($S_{PP}$, $S_{PS}$) to move the respective primary and secondary variator pulleys 18 and 20 toward each other. A return spring (not shown) or other return mechanism within each of the variator pulleys 18 and 20 moves the variator pulleys 18 and 20 away from each other when the respective primary and secondary pressures ($P_P$, $P_S$) are released. While shown schematically in FIG. 1 for illustrative simplicity, an example embodiment of the first and second actuators 28 and 30 includes a hydraulic piston/cylinder system, although other linear actuators may be used such as electromechanical devices or pneumatic pistons.

The first actuator 28 of FIG. 1 acts on a moveable one of the mating halves 19 of the primary variator pulley 18 in response to application of the primary pressure (arrow $P_P$). Likewise, the second actuator 30 acts on a moveable one of the mating halves 21 of the secondary variator pulley 20 in response to the secondary pressure (arrow $P_S$). Line pressure (arrow $P_L$) may be provided to the CVT 14 via a fluid pump 32 as shown, with the fluid pump 32 drawing fluid 33 such as oil from a sump 34 and circulating the fluid 33 to the CVT 14 via hoses, fittings, and other suitable fluid conduit (not shown). In one possible embodiment the line pressure (arrow $P_L$) is equal to secondary pressure ($P_S$). However, other embodiments may be envisioned in which the primary and secondary pressures (arrows $P_P$ and $P_S$, respectively) are independent of line pressure (arrow $P_L$).

The controller 50 may be configured as one or more computer devices having memory (M). The controller 50 may include hardware elements such as a processor (P), circuitry including but not limited to a timer, oscillator, analog-to-digital circuitry, digital-to-analog circuitry, proportional-integral-derivative (PID) control logic, a digital signal processor, and any necessary input/output devices and other signal conditioning and/or buffer circuitry. The memory (M) may include tangible, non-transitory memory such as read only memory, e.g., magnetic, solid-state/flash, and/or optical memory, as well as sufficient amounts of random access memory, electrically-erasable programmable read-only memory, and the like. Steps embodying the method 100 may be recorded in memory (M) and executed by the processor (P) in the overall control of the vehicle 10.

The controller 50, which is in communication with the first and second actuators 28 and 30, receives a set of control inputs (arrow $CC_I$) as part of the method 100 described below. The control inputs (arrow $CC_I$) may include the vehicle speed $N_{10}$ as reported, calculated, or measured by one or more wheel or transmission output speed sensors $S_{10}$, the pulley speeds ($\omega_P$, $\omega_S$), and an output torque request (arrow $T_{REQ}$). As is known in the art, the output torque request (arrow $T_{REQ}$) is typically determined by actions of a driver of the vehicle 10, such as via the present throttle request, braking levels, gear state, and the like. The vehicle 10 may include optional shift paddles 35 as shown in phantom, such that a driver of the vehicle 10 requests a shift via a tap of one of the shift paddles 35. In such a design, motion of the shift paddles 35 generates a requested shift signal (arrow RS) as part of the set of control inputs (arrow $CC_I$).

Figure 2:
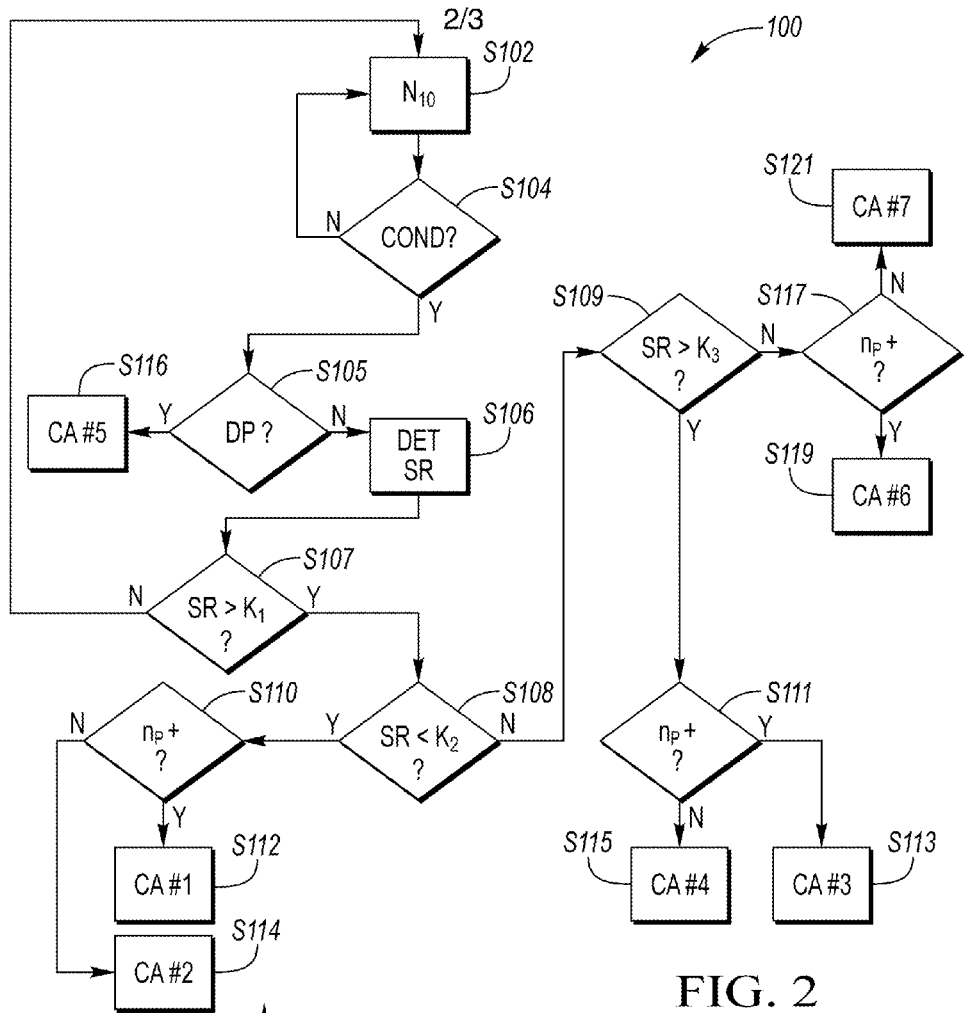
FIG. 2 is a flow chart describing an example embodiment of a method for controlling the speed ratio of the CVT shown in FIG. 1 during the sudden stop event.

Referring to FIG. 2, an example embodiment the method 100 commences at step S102 wherein the controller 50 of FIG. 1 determines the vehicle speed $N_{10}$. Step S102 may include measuring the vehicle speed $N_{10}$ via the speed sensor(s) $S_{10}$, for instance a wheel speed sensor or a transmission output speed sensor. The sensor $S_S$ in the example embodiment of FIG. 1 may measure a transmission output speed, which is the rotational speed of the output member 15. The method 100 proceeds to step S104 once the vehicle speed $N_{10}$ is transmitted or otherwise made available to the controller 50.

At step S104, the controller 50 next determines if vehicle conditions (COND) are indicative of a sudden stop event of the vehicle 10. Such conditions may include braking levels and/or a rate of change of vehicle speed ($N_{10}$), for instance a threshold rate of change of the speed of the output member 15. The method 100 proceeds to step S105 when the vehicle 10 has suddenly stopped or is in the process of doing so, and otherwise repeats step S104.

Step S105 includes determining if the CVT 14 of FIG. 1 has depressurized (DP). Depressurization may be readily determined by the controller 50 by evaluating the on/off state of the engine 12 of FIG. 1, which is known to the controller 50 via the present ignition state, along with the level of the pressures $P_P$ and $P_S$ of FIG. 1 relative to corresponding pressure thresholds. When the engine 12 is turned off, a distinct drop in fluid pressure should be detected via the pulley pressure sensors $S_{PP}$ and $S_{PS}$ of FIG. 1. The method 100 proceeds to step S116 when the CVT 14 has been depressurized, and otherwise proceeds to step S106.

At step S106, the controller 50 of FIG. 1 calculates the current speed ratio of the CVT 14, as abbreviated "DET SR" in FIG. 2. As noted above, the current speed ratio of the CVT 14 is the ratio of the output speed to the input speed of the CVT 14, i.e., $$\frac{\omega_S}{\omega_P}.$$

The method 100 proceeds to step S107 when the current speed ratio has been determined.

Step S107 entails comparing the calculated current speed ratio (SR) from step S106 to a calibrated minimum CVT ratio, i.e., the first threshold ratio (k1). The first threshold ratio (k1) is a predetermined/calibrated value that will vary with the design of the vehicle 10. It is a value below which the CVT 14 is considered to be optimal for launch of the vehicle 10. The method 100 is complete if the first threshold ratio (k1) is reached, i.e., no additional control actions are required by the controller 50 outside of launching the vehicle 10 when requested. The method 100 proceeds to step S108 if the current speed ratio (SR) exceeds the first threshold ratio (k1) during/after the sudden stop event.

Step S108 includes comparing the calculated current speed ratio (SR) from step S106 to the second threshold ratio (k2) and determining if the calculated current speed ratio is less than the second threshold ratio (k2). The second threshold ratio (k2) is pre-defined by known sensor characteristics of the speed sensors $S_P$ and $S_S$ of FIG. 1, sampling time, design-specific drive quality criteria, and the like, but is higher than the first threshold ratio (k1) and lower than the third threshold ratio (k3). The method 100 proceeds to step S110 if the current speed ratio of the CVT 14 is less than the second threshold ratio (k2). Otherwise, the method 100 proceeds to step S109.

At step S109, the controller 50 of FIG. 1 next determines whether the current speed ratio exceeds the third threshold ratio (k3). Launch is not enabled above the third threshold ratio (k3), is considered to be optimal at or below the first threshold (k1), and is possible but not optimal, e.g., may have a less than ideal feel or efficiency, between the second and third ratios (k2, k3). The method 100 proceeds to step S111 if the calculated current speed ratio exceeds the third threshold ratio (k3), and to step S117 in the alternative if the current speed ratio does not exceed the third threshold ratio (k3).

Step S110 includes determining whether the absolute pulley speeds $\omega_P$ and $\omega_S$, collectively $n_p$ in FIG. 2, are non-zero, as abbreviated $n_p^+$ in FIG. 2. For the purpose of method 100, any speed having an absolute value above zero or above a calibrated low non-zero value, e.g., 5-10 RPM, may be used. The method 100 proceeds to step S112 if the pulley speeds $n_p$ are non-zero, and to step S114 if the pulley speeds are zero.

Step S111 is effectively the same as step S110 described immediately above. However, step S111 is reached when the calculated current speed ratio of the CVT 14 exceeds the third threshold ratio (k3), while step S110 is arrived at only if the current speed ratio is less than the second threshold ratio (k2). The method 100 proceeds from step S111 to step S113 if the absolute pulley speeds $n_p$ are non-zero and to step S115 if the pulley speeds are zero, i.e., if the pulleys 18 and 20 have stopped or have slowed below the low threshold non-zero speed as noted above so as to have effectively stopped.

Step S112 includes executing a first control action (CA #1) via the controller 50 with respect to the CVT 14. This step occurs when the current speed ratio of the CVT 14 upon dropping below the calibrated speed ratio demarcating the lower boundary of speed sensor resolution is less than the second threshold ratio (k2) and the pulley speeds are non-zero.

Figure 3:
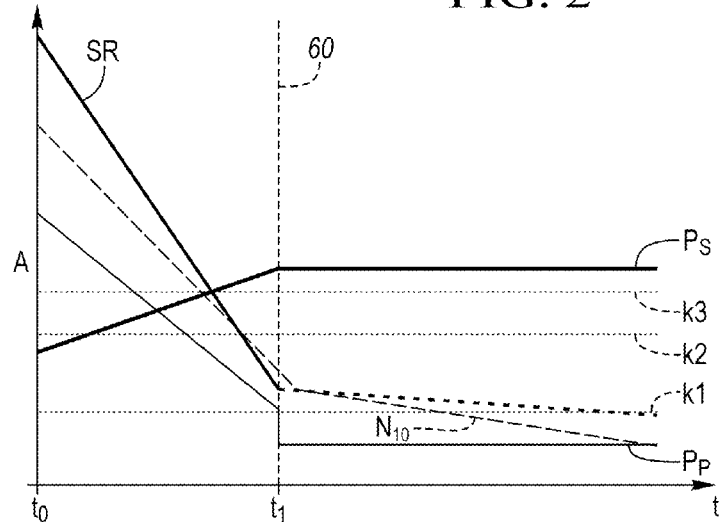
FIG. 3 is a time plot of changing amplitudes of different vehicle parameters illustrating a control action in which the CVT ratio is estimated or extrapolated to a calibrated minimum ratio, with time plotted on the x-axis and amplitude plotted on the y-axis.

Referring briefly to FIG. 3, vertical line 60 at $t_1$ demarcates a point in time after which the current speed ratio of the CVT 14 cannot be accurately determined. As noted above, the resolution of speed sensors tends to be poorer at lower rotational speeds. As the controller 50 of FIG. 1 must be aware of the current CVT ratio for optimal control of the CVT 14, specific control steps are taken at step S112 to ensure the current speed ratio reaches the calibrated minimum CVT ratio, i.e., the first threshold ratio (k1) shown in FIG. 3.

As part of step S112, when the vehicle speed ($N_{10}$) decreases between $t_0$ and $t_1$ during the rapid stop event, the controller 50 commands the pulley pressures $P_P$ and $P_S$ to the primary and secondary pulleys 18 and 20 such that the current speed ratio of the CVT 14 reaches the first threshold ratio (k1), for instance in a linear manner as shown, doing so via transmission of the pressure control signals (arrow $P_{CC}$) of FIG. 1. The last known valid current speed ratio calculation occurs at $t_1$ and is recorded in memory (M) of the controller 50, and the current speed ratio is estimated or extrapolated after $t_1$ using a set of CVT information. The last-estimated/extrapolated value can be used to control the CVT 14 during a subsequent launch of the vehicle 10 as shown in FIG. 3.

CVT information that can be used to estimate or extrapolate the current CVT speed ratio may include the known return spring characteristics and design of the pulleys 18 and 20, a temperature of the CVT 14, the specific design of the belt 22, hydraulic characteristics and restrictions, etc. The characteristics will vary with each design, and therefore can be calibrated offline and recorded in memory (M) of the controller 50, accessed by the processor (P) when the current speed ratio reaches line 60 at $t_1$, and thereafter used to estimate the current speed ratio. The controller 50 can then report the transmission state (arrow 11 of FIG. 1) to the ECM 150 or other controllers needed for launch control, indicating the uncertainty of the estimated current speed ratio, and can also temporarily disable the proportional-integral (PI) feedback compensation logic within the controller 50 for feedback compensation during this phase.

Figure 5:
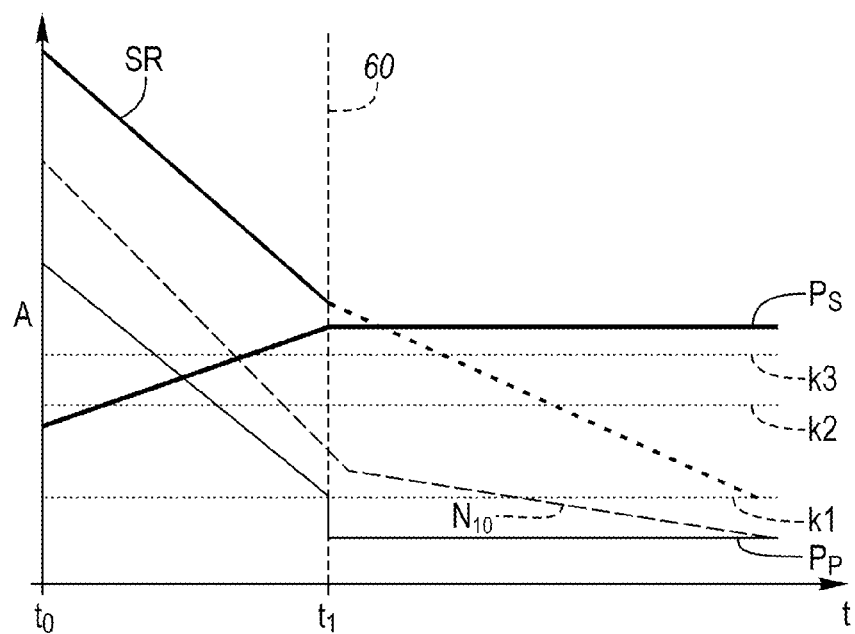
FIG. 5 is a time plot of changing amplitudes of different vehicle parameters illustrating another control action in which the CVT ratio is estimated or extrapolated to a calibrated minimum ratio at a faster rate than that depicted in FIG. 4, with time plotted on the x-axis and amplitude on the y-axis.

Step S113 includes executing a third control action (CA #3) when the current speed ratio of the CVT 14 is greater than a third threshold ratio (k3) and the pulley speeds are non-zero. The pressure commands for this control action are depicted in FIG. 5, with the SR trajectory depicted below the third threshold ratio (k3) before $t_1$. The third control action is similar in respects to the first control action of step S112. The last known valid calculated current speed ratio calculation at $t_1$ is recorded in memory (M) of the controller 50 and the speed ratio is thereafter estimated or extrapolated using the set of CVT information as noted above.

Unlike in the control action depicted in FIG. 3, the rate at which the speed ratio is reduced after $t_1$ in FIG. 5 is more rapid due to the elevated nature of the current speed ratio at $t_1$ relative to the third threshold ratio (k3). Vehicle launch is not possible/not enabled above the third threshold ratio (k3), but is possible, although not optimal, below the second threshold ratio (k2), and so step S113 may entail lowering the speed ratio below the second threshold ratio (k2). As with step S112, the CVT information that can be used to estimate or extrapolate the current CVT ratio using known return spring characteristics, the design of the pulleys 18 and 20, and other characteristics of the CVT 14 of FIG. 1, e.g., temperature, the specific design of the belt 22, etc. The controller 50 can report the transmission state (arrow 11) to the ECM 150 or other controllers needed for launch control and can also temporarily disable PI feedback compensation logic during this phase.

Figure 4:
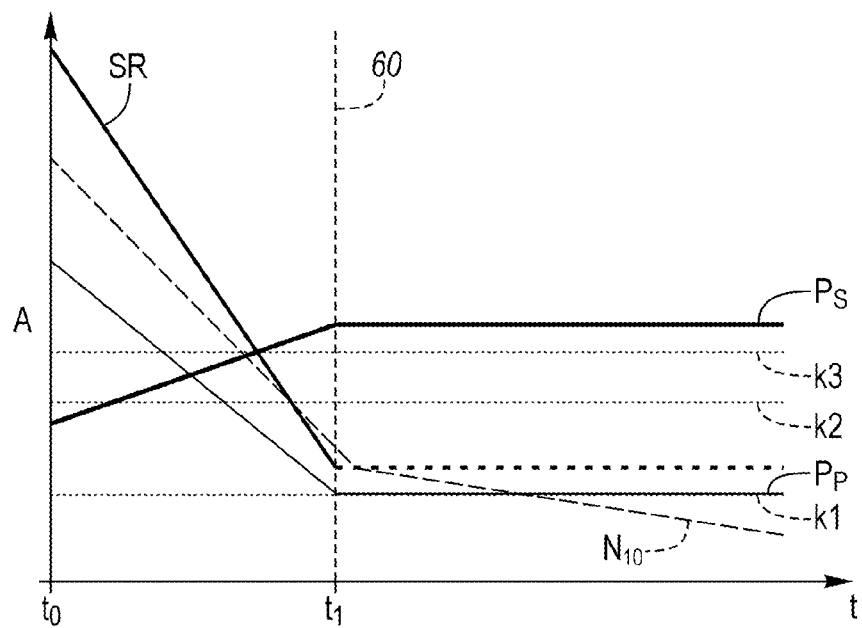
FIG. 4 is a time plot of changing amplitudes of different vehicle parameters illustrating a control action in which the CVT speed ratio is held constant, with time plotted on the x-axis and amplitude plotted on the y-axis.

Step S114 of FIG. 2 includes executing a second control action (CA #2) when the current speed ratio is less than the second threshold ratio (k2) and the pulley speeds are zero. This control action is depicted in FIG. 4. In contrast to FIG. 3 and the first control action of step S112, the second control action freezes/maintains the last valid calculated current speed ratio after $t_1$, and also freezes the primary and secondary pressures. Vehicle speed $N_{10}$ continues to decrease until the vehicle 10 stops. As with step S112, the controller 50 reports the CVT state (arrow 11) to the ECM 150 or other controllers needed for launch control and temporarily disables PI logic during this phase. That is, under low speed conditions the speed ratio of the CVT 14 cannot be accurately measured and calculated, and therefore PI feedback compensation does not work properly and, as a result, is temporarily disabled.

Step S115 includes executing a fourth control action (CA #4) when the current speed ratio (SR) is greater than a third threshold ratio (k3) and the pulley speeds are zero. The controller 50 may report the CVT state (arrow 11 of FIG. 1) and take other necessary actions. For instance, since the current ratio is too high for launch and the vehicle 10 is stopped, the controller 50 may command depressurization of the CVT 14 to cause a decrease in the speed ratio. In other words, the ratio is purposefully reduced toward the the first threshold ratio (k1) via depressurization of the CVT 14 so that a launch is possible.

At step S116, the controller 50 executes a fifth control action (CA #5) when the determination is made at step S105 that the CVT 14 is depressurized. When the CVT 14 is depressurized, the restoring force of the return spring in the secondary pulley and possibly the primary pulley move the pulleys back to the minimum ratio, i.e., first threshold ratio (k1). Step S116 may entail extrapolating the current speed ratio downward toward the first threshold ratio (k1) beginning at $t_1$ of FIGS. 3-5, again based on the characteristics of the return spring and other properties of the CVT 14 as noted above. In an embodiment, the controller 50 of FIG. 1 may use a timer to count through a calibrated duration indicative of the pulleys 18 and 20 having moved sufficiently to reach the minimum or first threshold ratio (k1), or a model or the like so that the controller 50 is aware that sufficient time passes for the first threshold ratio (k1) to be attained.

Step S117 entails determining if the absolute pulley speeds are non-zero. If so, the method 100 proceeds to step S119. If the pulley speeds are zero the method 100 proceeds in the alternative to step S121.

Step 119 includes executing a sixth control action (CA#6) when the pulleys 18, 20 are spinning and the speed ratio of the CVT 14 exceeds the second threshold ratio (k2) but not the third threshold ratio (k3), as determined at step S117. In this condition, the controller 50 of FIG. 1 can attempt to move the pulleys 18 and/or 20 to establish a lower speed ratio via the pressure control signals (arrow $P_{CC}$) of FIG. 1, which appear essentially as shown in FIG. 5.

Step S121 entails executing a seventh control action (CA#7) when the pulleys are not rotating and the speed ratio of the CVT 14 exceeds the second ratio (k2) but not the third threshold ratio (k3), as determined at step S117. In this condition, the controller 50 can hold the current speed ratio as shown in FIG. 4.

Using the method 100, the controller 50 of FIG. 1 is able to adapt the pressure control signals (arrow $P_{CC}$) after a sudden stop event in which the calibrated minimum speed ratio/first threshold ratio (k1) is not reached. The controller 50 can communicate the uncertainty of the determined ratio after such a stop, such as via transmission of a Boolean value indicative of such uncertainty, and can continue to function via estimation of the speed ratio. As a result, the vehicle 10 of FIG. 1 may be better able to launch after a sudden stop event.

While the best modes for carrying out the disclosure have been described in detail, those familiar with the art to which this disclosure relates will recognize various alternative designs and embodiments within the scope of the appended claims.

The invention claimed is:

1. A continuously variable transmission (CVT) comprising:
   an input member;
   an output member;
   a primary variator pulley operable for receiving an input torque;
   a secondary variator pulley operable for transmitting an output torque, wherein the primary and secondary variator pulleys are responsive to a respective primary and secondary pressure;
   first and second speed sensors operable for measuring a respective rotational speed of the primary and secondary variator pulleys, wherein the first and second speed sensors have a speed sensor resolution with a lower boundary; and
   a controller in communication with the first and second speed sensors, and programmed to:
   receive the measured rotational speeds of the primary and secondary variator pulleys from the first and second speed sensors;
   calculate a current speed ratio of the CVT using the measured rotational speeds when the CVT is operating above a first threshold CVT speed ratio;
   compare the calculated current speed ratio of the CVT to a plurality of calibrated threshold CVT speed ratios during a sudden stop event of the vehicle; and
   selectively execute one of a plurality of CVT control actions after the calculated current speed ratio drops below a calibrated CVT speed ratio demarcating the lower boundary of the speed sensor resolution during the sudden stop event, wherein the executed CVT control action depends on which of the plurality of calibrated threshold CVT speed ratios is exceeded by the calculated current speed ratio of the CVT.

2. The CVT of claim 1, wherein the controller is programmed with progressively higher threshold CVT speed ratios as the plurality of calibrated threshold CVT speed ratios, including the first threshold CVT speed ratio, a second threshold CVT speed ratio, and a third threshold CVT speed ratio, with the first threshold CVT speed ratio being a calibrated minimum CVT ratio that is optimal for launch of the vehicle after the sudden stop event, the second threshold CVT speed ratio being a ratio in which the launch of the vehicle is possible but not optimal, and the third threshold CVT speed ratio being a ratio above which the launch of the vehicle is not enabled.

3. The CVT of claim 2, wherein the plurality of CVT control actions includes a first control action when the calculated current speed ratio of the CVT exceeds the first threshold CVT speed ratio and not the second threshold CVT speed ratio and the rotational speeds are non-zero, and wherein the first control action includes estimating a current speed ratio of the CVT and thereafter controlling the primary and secondary pressures until the estimated current speed ratio of the CVT reaches the first threshold CVT speed ratio.

4. The CVT of claim 2, wherein the plurality of CVT control actions includes a second control action when the calculated current speed ratio of the CVT exceeds the first threshold CVT speed ratio and not the second threshold CVT speed ratio and the rotational speeds are zero, and wherein the second control action includes maintaining the primary and secondary pressures.

5. The CVT of claim 2, wherein the plurality of CVT control actions include a third control action when the calculated current speed ratio of the CVT exceeds the third threshold CVT speed ratio and the rotational speeds are non-zero, and wherein the third control action includes estimating a current speed ratio of the CVT and thereafter controlling the primary and secondary pressures such that the estimated current speed ratio of the CVT reaches the second threshold CVT speed ratio or the first threshold CVT speed ratio.

6. The CVT of claim 2, wherein the plurality of CVT control actions includes a fourth control action when the calculated current speed ratio of the CVT exceeds the third threshold CVT speed ratio and the rotational speeds are zero, and wherein the fourth control action includes depressurizing the CVT.

7. The CVT of claim 2, wherein the plurality of CVT control actions includes, when the calculated current speed ratio of the CVT exceeds the second threshold CVT speed ratio but not the third threshold CVT speed ratio and the rotational speeds are non-zero, controlling the primary and secondary pressures to attain the first threshold CVT speed ratio.

8. The CVT of claim 2, wherein the plurality of CVT control actions includes, when the current speed ratio of the CVT exceeds the third threshold CVT speed ratio and the rotational speeds are zero, maintaining the primary and second pressures.

9. The CVT of claim 2, wherein the plurality of CVT control actions includes selectively disabling proportional-integral feedback compensation logic.

10. A method of controlling a speed ratio of a continuously variable transmission (CVT) during a sudden stop event, the method comprising:
    receiving, via a controller, a measured rotational speed of a primary and a secondary variator pulley of the CVT from a first and a second speed sensor, respectively, wherein the first and second speed sensors have a speed sensor resolution with a lower boundary;
    calculating, via the controller, a current speed ratio of the CVT using the measured rotational speeds when the CVT is operating above a first threshold CVT speed ratio;
    comparing the calculated current speed ratio to a plurality of calibrated threshold CVT speed ratios during a sudden stop event of the vehicle; and
    selectively executing one of a plurality of CVT control actions, via the controller, after the calculated current speed ratio drops below a calibrated CVT speed ratio demarcating the lower boundary of the speed sensor resolution, during the sudden stop event in a manner that depends on which of the plurality of calibrated threshold CVT speed ratios is exceeded by the calculated current speed ratio.

11. The method of claim 10, wherein the plurality of calibrated threshold ratios includes progressively higher threshold CVT speed ratios, including the first threshold CVT speed ratio, a second threshold CVT speed ratio, and a third threshold CVT speed ratio, with the first threshold CVT speed ratio being a calibrated minimum CVT ratio that is optimal for launch of the vehicle, the second threshold CVT speed ratio being a ratio in which the launch is possible but not optimal, and the third threshold CVT speed ratio being a ratio above which the launch of the vehicle is not enabled.

12. The method of claim 11, wherein selectively executing one of the plurality of CVT control actions includes executing a first control action when the calculated current speed ratio of the CVT exceeds the first threshold CVT speed ratio and not the second threshold CVT speed ratio and the rotational speeds are non-zero, and wherein executing the first control action includes estimating a current speed ratio of the CVT after the calculated current speed ratio of the CVT drops below the threshold CVT speed ratio and thereafter controlling the primary and secondary pressures until the estimated current speed ratio reaches the first threshold CVT speed ratio.

13. The method of claim 11, wherein selectively executing one of the plurality of CVT control actions includes executing a second control action when the calculated current speed ratio of the CVT exceeds the first threshold CVT speed ratio and not the second threshold CVT speed ratio and the rotational speeds are zero, and wherein executing the second control action includes maintaining the primary and secondary pressures.

14. The method of claim 11, wherein selectively executing one of the plurality of CVT control actions includes executing a third control action when the calculated current speed ratio of the CVT exceeds the third threshold CVT speed ratio and the rotational speeds are non-zero, and wherein executing the third control action includes estimating a current speed ratio of the CVT after the calculated current speed ratio of the CVT drops below the first threshold CVT speed ratio and thereafter controlling the primary and secondary pressures such that the estimated current speed ratio reaches the second threshold CVT speed ratio or the first threshold CVT speed ratio.

15. The method of claim 11, wherein selectively executing one of the plurality of CVT control actions includes executing a fourth control action when the calculated current speed ratio of the CVT exceeds the third threshold CVT speed ratio and the rotational speeds are zero, and wherein executing the fourth control action includes depressurizing the CVT.

16. The method of claim 11, wherein selectively executing one of the plurality of CVT control actions includes, when the calculated current speed ratio of the CVT exceeds the second threshold CVT speed ratio but not the third threshold CVT speed ratio and the rotational speeds are non-zero, controlling the primary and secondary pressures to attain the first threshold CVT speed ratio.

17. The method of claim 11, wherein selectively executing one of the plurality of CVT control actions includes, when the current speed ratio of the CVT exceeds the third threshold CVT speed ratio and the rotational speeds are zero, maintaining the primary and second pressures.

18. The method of claim 11, wherein selectively executing one of the plurality CVT control actions includes selectively disabling proportional-integral feedback compensation logic.

* * * * *